US006914032B2

(12) United States Patent
Kim et al.

(10) Patent No.: US 6,914,032 B2
(45) Date of Patent: Jul. 5, 2005

(54) METHOD OF PRODUCING TUNGSTEN-COPPER BASED COMPOSITE POWDER AND SINTERED ALLOYS FOR HEAT-SINK USING SAID COMPOSITE POWDER

(75) Inventors: Byoung Kee Kim, Changwon-shi (KR); Seong Hyeon Hong, Changwon-shi (KR); Yong Won Woo, Seongnam-shi (KR)

(73) Assignees: Korea Institute of Machinery and Materials (KR); Nanotech Co., Ltd. (KR)

( * ) Notice: Subject to any disclaimer, the term of this patent is extended or adjusted under 35 U.S.C. 154(b) by 382 days.

(21) Appl. No.: 10/271,443

(22) Filed: Oct. 16, 2002

(65) Prior Publication Data

US 2003/0124016 A1 Jul. 3, 2003

(30) Foreign Application Priority Data

Dec. 27, 2001 (KR) ......................................... 2001-85933

(51) Int. Cl.⁷ ........................... B01J 23/00; B01J 23/70; B22F 1/00; C22C 27/04; C22C 9/00
(52) U.S. Cl. ...................... 502/318; 502/305; 502/345; 75/352; 75/357; 419/31; 419/38; 428/570; 420/430; 420/469; 420/495; 420/587
(58) Field of Search ................................. 502/318, 305, 502/345; 75/352, 357; 419/31, 38; 428/570; 420/430, 469, 495, 587

(56) References Cited

U.S. PATENT DOCUMENTS

| | | | | |
|---|---|---|---|---|
| 3,792,107 A | * | 2/1974 | Fattore et al. | ............. 585/646 |
| 5,686,676 A | * | 11/1997 | Jech et al. | ............. 75/247 |
| 5,842,108 A | | 11/1998 | Kim et al. | ............. 419/33 |
| 5,897,962 A | * | 4/1999 | Houck et al. | ............. 428/548 |
| 5,912,399 A | * | 6/1999 | Yu et al. | ............. 75/351 |
| 5,956,560 A | * | 9/1999 | Dorfman et al. | ............. 419/38 |
| 6,103,392 A | * | 8/2000 | Dorfman et al. | ............. 428/570 |

FOREIGN PATENT DOCUMENTS

| | | | | |
|---|---|---|---|---|
| JP | 61-069904 | * | 4/1986 | ............. B22F/9/22 |
| JP | 61-069907 | * | 4/1986 | ............. B22F/9/30 |
| JP | 2003-193116 | * | 7/2003 | ............. B22F/9/20 |

* cited by examiner

Primary Examiner—Mark L. Bell
Assistant Examiner—Patricia L. Hailey
(74) Attorney, Agent, or Firm—Meyertons, Hood, Kivlin, Kowert & Goetzel, P.C.; Eric B. Meyertons

(57) ABSTRACT

The present invention relates to a method of producing W—Cu based composite powder, which is used in heat-sink materials for high-power integrated circuits, electric contact materials, etc, and to a method of producing a W—Cu based sintered alloy by using the composite powder. The method of producing tungsten-copper based composite powder includes first preparing composite oxide powder by dissolving ammonium metatungstate, $[(NH_4)_6(H_2W_{12}O_{40}) \cdot 4H_2O]$, as water-soluble tungsten salt, and copper nitrate or copper acetate in water to the desirable composition, followed by spray-drying and calcining; then preparing a tungsten oxide powder by separately calcining a tungsten-containing salt, such as ammonium paratungstate, $(NH_4)_{10}(H_{10}W_{12}O_{46})$; forming ultra-fine tungsten-copper based composite oxide powder by mixing 20~75 wt % of the composite oxide powder and 80~25 wt % of the tungsten oxide powder to the desirable composition, followed by ball-milling; and reducing the ultra-fine tungsten-copper based composite oxide powder at temperature of 650~1,050° C. If the composite powder is molded into a certain size and sintered thereafter in temperature of 1,110~1,450° C., a W—Cu based sintered alloy of superior thermal and electric conductivities can be obtained thereby.

11 Claims, 3 Drawing Sheets a) Conventional Material 3 b) Inventive Material 1

METHOD OF PRODUCING TUNGSTEN-COPPER BASED COMPOSITE POWDER AND SINTERED ALLOYS FOR HEAT-SINK USING SAID COMPOSITE POWDER

FIELD OF THE INVENTION

The present invention relates to a method of producing a W—Cu based composite powder, which is used in heat-sink materials for high-power integrated circuits, electric contact materials, etc, and to a method of producing a W—Cu based sintered alloy by using said composite powder.

BACKGROUND OF THE INVENTION

W—Cu based composite sintered alloys consisting of tungsten particles and a copper matrix are used as materials for high voltage contact points and electrodes since they have a combination of characteristics such as low thermal expansion coefficient of tungsten, high arc resistance and electric conductivity. In particular, a W—Cu based alloy containing 5~20 wt % of Cu is used as a heat sink material since it has suitable thermal conductivity and the thermal expansion coefficient of W—Cu alloy is similar to that of the ceramics. Moreover, a W—Cu based alloy containing 20~40 wt % of Cu is used in the manufacture of electric contact materials and electrodes, and shaped charge liner with high density for munitions.

The W—Cu based sintered alloy of this type is mainly produced by sintering of a powder. However, it is not so easy to produce a uniform alloy of high density by sintering in liquid phase or by way of an infiltration method since there is no mutual solid solubility and large difference in specific gravity. Accordingly, by adding a small amount of a transition metal, such as Ni and Co, it is possible to obtain dense sintered bodies. However, by using these added elements, there is the disadvantage of lowering thermal conductivity of the resulting alloy. Recently, by making the powder particles fine and maximizing the degree of mixing, the mechanical alloying methods, etc. have been recently applied in the industry. However, the above methods are susceptible to contamination by impurities and are not so easily adaptable to mass production. In particular, when making an alloy of 20 wt % or below of Cu, it is very difficult to obtain dense sintered bodies by an infiltration method or by a liquid-phase sintering.

Recently, Korean Patent No. 213,682 disclosed a technique of producing a dense W—Cu based alloy containing 10~30 wt % of Cu by dissolving tungsten salt and copper salt in water, followed by removing salt during spray-drying and milling the composite oxides obtained above, and then reducing and compacting the composite powder, followed by sintering. By using this technique, the rearrangement of W particles within the aggregates of reduced powder in the green body is easy in the W—Cu based composite powder containing 20 wt % or less of Cu. However, this easiness maybe cause the formation of pores between the aggregates, and accordingly the sintered body cannot be fully densified.

SUMMARY OF THE INVENTION

Described herein is a method of producing W—Cu based composite powder having excellent sinterability without other additives and uniform mixing state of W and Cu, which have no mutual solubility and large differences in specific gravity.

Moreover, described herein is a method of producing a dense W—Cu based sintered alloy for heat-sink plates, having good sintering property, and electric and thermal conductivities by sintering a W—Cu based composite powder through a suitable sintering process, which results in virtually no pores between the aggregates of the powder therein.

A method of producing a tungsten-copper based composite powder includes:

(1) preparing a composite oxide powder by dissolving a water-soluble tungsten salt and a salt containing Cu in water to produce a composition, followed by spray-drying and calcining the resulting composition;

(2) preparing tungsten oxide powder by separately calcining a salt containing tungsten;

(3) forming an ultra-fine tungsten-copper based composite oxide powder by mixing 20~75 wt % of the composite oxide powder and 80~25 wt % of the tungsten oxide powder, followed by ball-milling the mixture; and (4) reducing the ultra-fine tungsten-copper based composite oxide powder.

Moreover, the method of producing a tungsten-copper sintered alloy for heat-sink materials further includes sintering after compacting the reduced composite oxide powder.

Moreover, the method of producing a tungsten-copper sintered alloy for heat-sink materials further includes compacting the ultra-fine tungsten-copper composite oxide powder as obtained above, and then reduction and sintering.

In the method of producing a W—Cu based composite powder, it is preferable to apply W—Cu based composite powder containing approximately 5 wt % or more of Cu. If the amount of Cu in the W—Cu composite powder is 5 wt % or less, the thermal expansion coefficient of sintered bodies becomes less than that of the ceramics, which leads to difficulties in using it as heat-sink plates. More preferably, a W—Cu based composite powder containing 5~40 wt % of Cu should be applied therein. A W—Cu based composite powder containing 10~20 wt % of Cu is most suitable for heat-sink plates.

DESCRIPTION OF THE PREFERRED EMBODIMENTS

Figure 1:
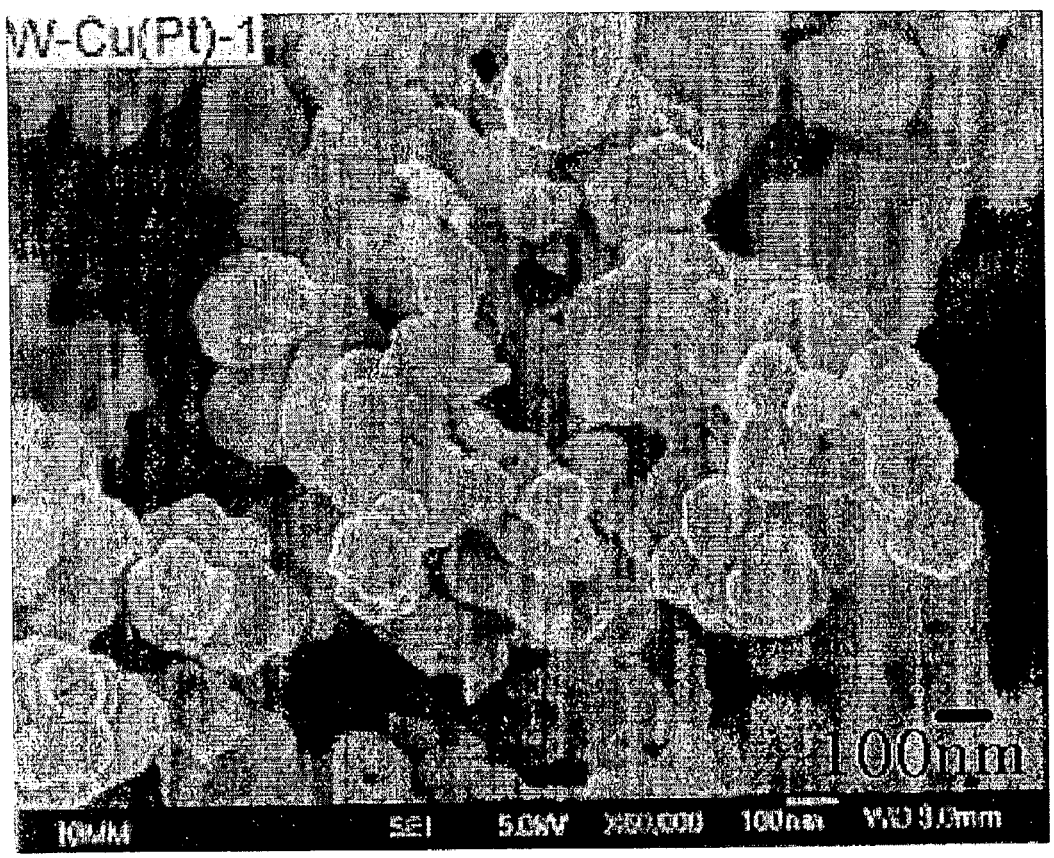
FIG. 1 is a microstructure of field emission of Material 1, which was taken by a scanning electron microscope.

A method of producing a tungsten-copper based composite powder is described in detail as below.

The method of producing tungsten-copper based composite powder is characterized by substantially enhancing electric and thermal conductivities of the sintered alloy as produced herein, wherein the method includes dissolving a water-soluble tungsten salt and a salt containing Cu in water to produce a homogeneous mixture of W and Cu, which have virtually no mutual solid solubility and large differences in specific gravity; spray-drying the mixture to obtain composite oxide powder, calcining the composite oxide powder, mixing the calcined composite oxide powder at an appropriate ratio with additional tungsten oxide obtained by a separate calcination, and reducing the mixed powder obtained by above process.

The method of producing tungsten-copper based materials includes two methods as follows. One method includes compacting the reduced composite powder obtained by above-mentioned process; and sintering the compacted body. The second method comprises compacting the mixed powder by above-mentioned process; reducing the compacted powder; and sintering the compacted powder. The sintered bodies fabricated by above-mentioned processes have nearly full-densified structures and high thermal conductivity.

First, in the present invention, the tungsten salt used during manufacturing the composite oxide powder may preferably be a water-soluble tungsten salt. The water-soluble tungsten salt, for example, could be ammonium metatungstate $[(NH_4)_6(H_2W_{12}O_{40}).4H_2O]$.

Moreover, the salt containing Cu may preferably be a copper salt dissolvable in water or acid, for example, copper nitrate $[Cu(NO_3)_2.3H_2O]$, or copper acetate $[Cu(CH_3COO)_2.H_2O]$.

The composition of the W—Cu based composite oxide powder is determined by the mixing ratio of the water-soluble tungsten salt, and the salt containing copper. Hence, if the composition of the final W—Cu based composite powder is predetermined, the tungsten salt and the salt containing Cu are dissolved in water to obtain the desirable composition.

The composite oxide powder is prepared by spray-drying the aqueous solution mixed appropriately as described above. Spray-drying involves drying liquid materials by spraying the liquid through a nozzle with hot air. By spray-drying and calcining the aforementioned mixed aqueous solution under standard conditions, water is removed to produce a composite oxide powder. Preferably, the spray-drying is carried out at 100° C. or more in order to sufficiently evaporate water. If the temperature of hot air during spray-drying is less than 100° C., insufficient evaporation of water may occur.

The calcination after spray-drying is preferably carried out at a temperature of 300~1,000° C. If the calcination temperature is less than 300° C., the dissolution of salt may not be sufficient, and if the calcination temperature is 1,000° C. or more, the energy consumption while removing salt is not economical, and such high temperature may facilitate growth of composite oxide particles.

The composite oxides obtained through the spray-drying process have particle sizes of 20~70 μm.

Next, the salt containing tungsten is separately calcined to prepare a tungsten oxide powder. A salt containing tungsten may be ammonium metatungstate or ammonium paratungstate $[(NH_4)_{10}(H_{10}W_{12}O_{46})]$ for the formation of a tungsten oxide powder. As above, the calcination is preferably carried out at a temperature of 300~1,000° C. The singular tungsten oxides obtained through the calcination have particle sizes of 7~30 μm.

The composite oxide powder prepared as above and the tungsten oxide powder are mixed in an appropriate ratio to the desirable final composition. This mixture is milled to yield ultra-fine tungsten-copper based composite oxide powder. Preferably, the composite oxide powder and the tungsten oxide powder are mixed at a ratio of 20~75 wt % of the composite oxide powder and 25~80 wt % of the tungsten oxide powder. If the mixed ratio of the composite oxide powder is 75 wt % or more, it facilitates rearrangement between W particles within the aggregates in the reduced composite powder (after spray-drying, removing salt and reducing the same). However, it becomes difficult to achieve full densification due to the remaining pores between the aggregates. On the other hand, if the ratio of singular tungsten oxides added thereto is 80 wt % or more, the copper is not evenly distributed between the reduced powder, which results in difficulties in rearrangement of W particles during sintering, which in turn leads to difficulties in achieving full densification.

The fabrication of ultra-fine composite oxide powder can be accomplished preferably by ball milling of the composite oxide powder. Of the types of ball-millings, wet milling is preferable over drying milling. Drying milling without adding solvent is not an easy milling process since the composite oxide powder and the singular tungsten powder can easily stick to the inner walls of the milling jar, and the partially unmilled spherical oxide powder may lead to inhomogeneous structure after sintering. On the other hand, with wet milling, this problem may be avoided since the oxide powder is well dispersed therein. With the wet milling process, the milling conditions may change according to the amounts of mixtures or the size of ultra-fine particles. In the present invention, it is preferable to have a milling time of at least about two hours, for example. If the wet milling time is less than two hours, it is not so easy to mill the precursors. Preferably, the milling is carried out for 2~24 hours. If the milling time is 24 hours or longer, it facilitates introduction of impurities as well as being uneconomical. The ultra-fine W—Cu based composite powder as obtained by such milling of the present invention has a powder size of approximately 1 μm or less.

The ultra-fine tungsten-copper based composite powder is subjected to a reduction process. The reduction of the composite oxide powder can be carried out before compaction, or the compaction can be first carried out in the non-reduced state, followed by reduction. The reduction is preferably carried out in an atmosphere of nitrogen, dissolved ammonia gas, or nitrogen plus inert gas ($N_2$, Ar, etc.) Moreover, the reduction is preferably carried out at 650~1,050° C. If the reduction is carried out at approximately 650° C. or lower, it takes more reduction time, and if the reduction is carried out at 1,050° C. or higher, it deteriorates the sintering property due to powder agglomeration occurring therein.

On the other hand, by way of carrying out a suitable sintering process, as compared to the conventional W—Cu based composite powder, the aforementioned ultra-fine W—Cu based composite powder can achieve nearly full densification since W particles are well rearranged during sintering, which results in virtually no pores between the powder agglomerates. Accordingly, for the production of sintered alloys using W—Cu based composite powder, the composite powder prepared by above-mentioned method may be compacted in certain shapes of green bodies, followed by sintering of the green bodies. At that time, it is preferable to carry out the sintering at 1,100~1,450° C. If the sintering is carried out at temperature of 1,100° C. or less, it requires longer sintering time. If it is carried out at temperature of 1,450° C. or higher, there is a possibility of volatilization of Cu, which may lead to distortion in the shape of sintered bodies. More preferably, the sintering is carried out at 1,150~1,400° C.

Although the production of a tungsten-copper based sintered alloy may be done by way of the aforementioned method, it may also be accomplished by first compacting the ultra-fine tungsten-copper based composite oxide powder without reducing the same, followed by reduction and sintering.

The tungsten-copper based sintered alloy of the present invention as produced above is very dense with a relative density of approximately 98% or more, and is also very suitable for heat-sink materials due to its electric conductivity of at least 35% or more, and thermal conductivity of at least 200 W/mK.

Below, the present invention is described in detail by way of examples. However, the scope or the technical concept of the present invention should not be deemed to be limited whatsoever by the conditions of the examples.

Inventive Materials 1

An aqueous solution was prepared by dissolving ammonium metatungstate [$(NH_4)_6(H_2W_{12}O_{40}) \cdot 4H_2O$] and copper nitrate [$Cu(NO_3)_2 \cdot 3H_2O$] in water to the target composition 80 wt % of W and 20 wt % of Cu. The precursor was made by spray-drying the aqueous solution by supplying the same at a flow rate of approximately 20 cc/minute to the spray-dryer while stirring. At that time, the rotational speed of the spray nozzle was approximately 11,000 rpm while the air was injected at a heated temperature of approximately 250° C. The composite oxide powder of 80 wt % of W and 20 wt % of Cu was prepared by removing remaining water and salt components by way of maintaining the spray-dried precursor at approximately 500° C. for one hour. Moreover, the singular oxide $WO_3$ (average particle size of approximately 22 μm) was prepared by separately calcining ammonium metatungstate at approximately 700° C. for 30 minutes.

Thereafter, 299.7 g (49.95% ) of the 80% W-20% Cu composite oxide powder, 300.3g (50.05% ) of $WO_3$, approximately 6,570 g of carbide balls, and 750 cc of hexane were placed into an aluminum jar of 1.5 l capacity. Then, the granular oxides were pulverized by ball milling at a rotational speed of 100 rpm for approximately six hours, followed by drying.

Then, the milled oxide powder was reduced at approximately 200° C. for one hour in a rotary-type furnace, into which hydrogen was influxed at approximately 1,500 cc/minute. Thereafter, the reduction was carried out again for eight hours at approximately 700° C. to yield 90% W-10% Cu-based composite oxide powder.

Approximately 5 g of the powder as reduced above was then prepared and the green body was compacted under uni-axial pressure of approximately 3 ton/cm² thereto. Then, a sample compact of diameter of 15 mm and thickness of 3.3 mm was manufactured by cold isostatic pressing of the powder with approximately 3 ton/cm² of pressure. The sample piece was sintered for one hour at approximately 1,400° C. by heating with a heating rate of 3° C./minute in the hydrogen atmosphere. Then, without holding time, it was cooled and cut, followed by polishing. The microstructure of the polished cross-section was observed with the scanning electron microscope.

Moreover, sintered density, electric conductivity, thermal conductivity and thermal expansion coefficient of sintered bodies were measured, which are shown in Table 1.

Inventive Material 2

Instead of copper nitrate, copper acetate [$Cu(CH_3COO)_2 \cdot H_2O$] was used. The milled oxide powder was reduced in a rotary-type furnace for one hour at approximately 200° C. Thereafter, except for reducing it for five hours at approximately 800° C., the 90% W-10% Cu-based composite sintered alloy was produced under the same conditions of the Inventive Material 1. The electric conductivity, thermal conductivity, and thermal expansion coefficient of sintered bodies were measured, which are shown in Table 1.

Inventive Material 3

The composite powder of the Inventive Material 1, without first reducing, was compacted under the same conditions of the Inventive Material 1, and then reduced and sintered. By this procedure, the 90% W-10% Cu sintered alloy was prepared. The electric conductivity, thermal conductivity, and thermal expansion coefficient of sintered bodies were measured, which are shown in Table 1.

Inventive Material 4

The aqueous solution was prepared by dissolving ammonium metatungstate and copper nitrate in water to the target composition of 75% W-25% Cu. Then, the precursor was made by spray-drying the aqueous solution under the same conditions of Inventive Material 1. Thereafter, 233.8 g (59.955% ) of the 75% W-25% Cu composite oxide powder, 156.2 g (40.045% ) of $WO_3$, approximately 5,155 g of carbide balls, and 490 cc of hexane were placed into an aluminum jar of 1.17 l capacity. Then, the granular oxides were pulverized by milling at a rotational speed of 110 rpm for approximately six hours, followed by drying.

Then, the pulverized oxide powder was reduced as in the Inventive Material 1 of the Present Invention to yield 85% W-15% Cu based composite oxide powder. To this powder, compacting and sintering were carried out to yield a sample piece. With respect to the sample piece of sintered alloy, its sintered density, electric conductivity, thermal conductivity, and thermal expansion coefficient were measured, which are shown in Table 1.

Conventional Material 1

The tungsten powder with a particle size of approximately 1 μm, and the Cu powder of 325 mesh or below were mixed, and then the 90% W-10% Cu sintered alloy was produced by compacting these powder under the same conditions of Inventive Material 1, followed by sintering. With respect to the sample piece of sintered alloy, its sintered density, electric conductivity, thermal conductivity, and thermal expansion coefficient were measured, which are shown in Table 1.

Conventional Material 2

The tungsten powder with a particle size of approximately 1 μm, the Cu power of 325 mesh or below, and a Ni sintering agent of approximately 2 μm were mixed, and then the 90% W-9% Cu-1% Ni sintered alloy was produced by compacting under the same conditions of the Inventive Material 1, followed by sintering. With respect to the sample piece of sintered alloy, its sintered density, electric conductivity, thermal conductivity, and thermal expansion coefficient were measured, which are shown in Table 1.

Conventional Material 3

The aqueous solution was prepared by dissolving ammonium metatungstate, and copper nitrate to the target composition 90% W-10% Cu. Then, the precursor was made by spray-drying the aqueous solution under the same conditions of the Inventive Material 1. Then, the spray-dried precursor was reduced as in Inventive Material 1 to yield 90% W-10% Cu based composite oxide powder in order to produce sintered alloy. With respect to the sample piece of sintered alloy, its sintered density, electric conductivity, thermal conductivity, and thermal expansion coefficient were measured, which are shown in Table 1.

Conventional Material 4

The tungsten powder with a particle size of approximately 1 μm, and the Cu power of 325 mesh or below were mixed, and then the 85% W-15% Cu sintered alloy was produced by compacting these powder under the same conditions of the Inventive Material 1, followed by sintering. With respect to the sample piece of sintered alloy, its sintered density, electric conductivity, thermal conductivity, and thermal expansion coefficient were measured, which are shown in Table 1.

Conventional Material 5

The tungsten powder with a particle size of approximately 1 μm, Cu power of 325 mesh or below, and a Co sintering agent of approximately 2 μm were mixed, and then the 84.5% W-15% Cu-0.5% Co sintered alloy was produced by compacting under the same conditions of the Inventive Material 1, followed by sintering. With respect to the sample piece of sintered alloy, its sintered density, electric conductivity, thermal conductivity, and thermal expansion coefficient were measured, which are shown in Table 1.

Conventional Material 6

The aqueous solution was prepared by dissolving ammonium metatungstate, and copper nitrate to the target composition 85% W-15% Cu. Then, the precursor was made by spray-drying the aqueous solution under the same conditions of the Inventive Material 1. Then, the spray-dried precursor was reduced as in the Inventive Material 1 to yield 85% W-15% Cu-based composite oxide powder in order to produce sintered alloy. With respect to said sample piece of sintered alloy, its sintered density, electric conductivity, thermal conductivity, and thermal expansion coefficient were measured, which are shown in Table 1.

did not occur easily, and after reaching around 1,400° C., it only formed into sintered body of relative density of approximately 85%.

Figure 3:
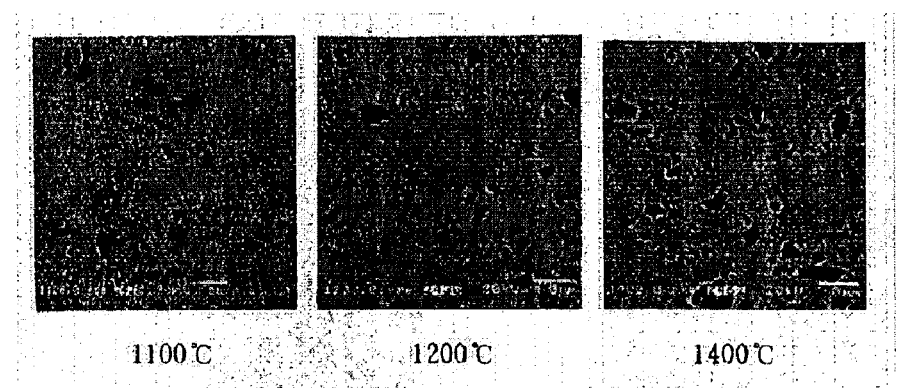
FIG. 3 respectively shows the microstructures of Material 1 and those of the prior art 3 at each temperature.
Figure 3:
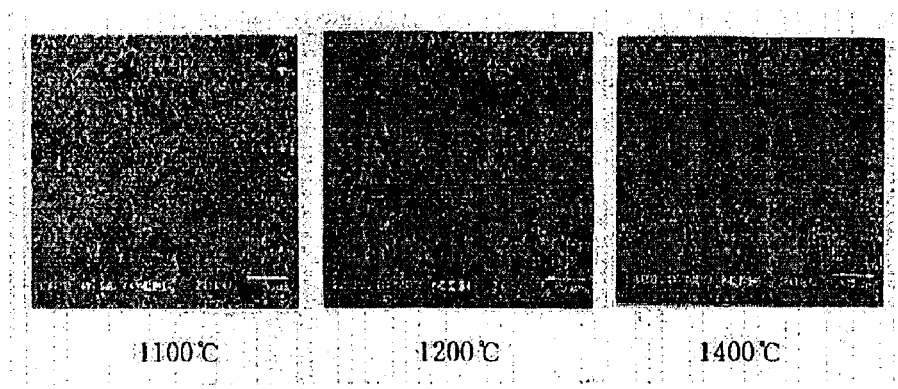

FIG. 3 compares the microstructures of the Conventional Material 3, and the Inventive Material 1 at respective temperatures. As shown in FIG. 3, in case of the green bodies of Material 3, the powder aggregated within the green bodies of the conventional powder, and underwent solid-phase sintering in itself when it was heated up until 1,000° C., and the pores existed between the aggregates of the powder. With an increase in temperature, Cu became liquid, which eliminated many of these pores by filling them, but even at 1,400° C. approximately, some pores were still remained. On the other hand, in the green bodies of the Inventive Material 1, the powder in all locations shrank evenly up until 1,000° C., and thus large pores as in the sintered bodies of the conventional powder were not observed. Moreover, with an increase in temperature, Cu turned into liquid, which lead to homogeneous rearrangement of W particles, and at 1,400° C. approximately, it showed a dense structure, virtually without pores. From these results, it can be seen that the powder produced

TABLE 1

| | | Experimental Results | | | |
|---|---|---|---|---|---|
| Type | Composition (wt %) | Sintering Density (g/cm³) (Relative Density (%)) | Electric Conductivity (%), IACS | Thermal Conductivity (W/mK) | Thermal Expansion Coefficent (ppm/K) |
| Inv. 1 (PI) | 90W-10Cu | 17.07(98.6%) | 36.3 | 203 | 6.2 |
| Inv. 2 (PI) | 90W-10Cu | 16.96(98.03%) | 35.6 | 210 | 6.2 |
| Inv. 3 (PI) | 90W-10Cu | 17.04(98.5%) | 36.0 | 202 | 6.2 |
| Inv. 4 (PI) | 85W-15Cu | 16.14(99.7%) | 38.9 | 218 | 6.9 |
| Conv. 1 (PR) | 90W-10Cu | 14.70(85%) | 23.0 | 140 | 6.1 |
| Conv. 2 (PR) | 90W-9Cu-1Ni | 17.04(98.5%) | 27.5 | 150 | 6.1 |
| Conv. 3 (PR) | 90W-10Cu | 14.80(85.6%) | 28.0 | 151 | 6.1 |
| Conv. 4 (PR) | 85W-15Cu | 13.90(86%) | 23.0 | 129 | 6.8 |
| Conv. 5 (PR) | 84.5W-15Cu-0.5Co | 16.03(99.0%) | 28.0 | 157 | 6.9 |
| Conv. 6 (PR) | 85W-15Cu | 14.56(90.0%) | 31.3 | 175 | 6.8 |

Table 1 compares the characteristics of sintered alloys of the Conventional Materials (1~6) and the Inventive Materials (1~4). As shown in Table 1, as compared to the Conventional Materials (1~6), the Inventive Materials (1~4) of the present invention were superior in terms of electric conductivity, and thermal conductivity since they have high sintering density.

Meanwhile, FIG. 1 is a microstructure of the field emission of the Inventive Material 1, which was taken with a scanning electron microscope. As shown in Table 1, the Inventive Material 1 is of composite powder of approximately 1 μm, in which particles of approximately 100 nm or less are aggregated therein.

Figure 2:
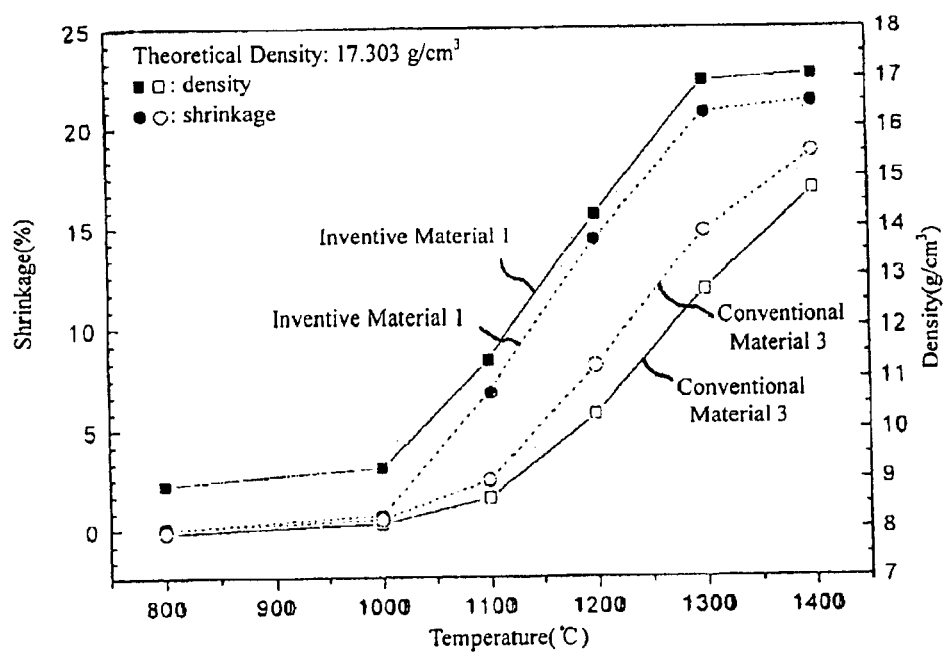
FIG. 2 is a graph comparing the percentages of radial shrinkage percentages and density changes of Material 1 and those of the prior art at respective temperatures during heating their green body.

With respect to the Inventive Material 1, and the Conventional Material 3, FIG. 2 compares their shrinkage percentages, and density changes at various temperatures during heating. As shown in Table 2, the Inventive Material 1 had relative density of approximately 51%, which is higher than the compact density of approximately 46% of the Conventional Material 3. More specifically, the Inventive Material 1 did not have significant shrinkage until about 1,000° C. but started to shrink greatly at 1,100° C. or higher, which is the melting point of Cu. After reaching around 1,400° C., it formed into sintered body with relative density of 98% or more. Although the tendency toward densification in the Conventional Material 3 was similar, but the shrinkage according to the present invention, as compared to those of the prior art, is contrastingly superior in terms of its sintering property.

As described above, the present invention in effect provides a W—Cu based sintering alloy of superior thermal conductivity and electric conductivity by way of having excellent sinterability, which is produced by means of spray-drying an aqueous solution of water-soluble tungsten salt and salt containing Cu, mixing the composite oxides obtained therefrom with singular tungsten oxides, followed by milling, reducing and sintering.

With respect to the present invention as above, only the examples are described in detail, but within the scope of the technical concept of the present invention, a variety of modifications and changes are possible, as should be obvious to a person having ordinary skill in the art to which the present invention pertains, and said modifications and changes should of course be deemed to be within the scope of the claims herein.

What is claimed is:

1. A method of producing a tungsten-copper based composite powder, comprising:
   (a) preparing a composite oxide powder by dissolving a water-soluble tungsten salt, and a salt containing copper in water, followed by spray-drying the resulting mixture and calcining the resulting spray dried mixture;

(b) preparing a tungsten oxide powder by calcining a salt containing tungsten;

(c) forming an ultra-fine tungsten-copper based composite oxide powder by mixing 20~75 wt % of the composite oxide powder with 80~25 wt % of the tungsten oxide powder, followed by ball-milling the tungsten-copper based composite powder-tungsten oxide powder mixture; and (d) reducing the ultra-fine tungsten-copper based composite oxide powder.

2. The method according to claim 1, wherein spray-drying is carried out at temperature of 100° C. or higher.

3. The method according to claim 1, wherein calcining is carried out at temperature of 300~1,000° C.

4. The method according to claim 1, wherein reducing is carried out at temperature of 650~1,050° C. in an atmosphere of hydrogen, or decomposed ammonia gas, or hydrogen plus an inert gas.

5. The method according to claim 1, wherein the water-soluble tungsten salt is ammonium metatungstate, $[(NH_4)_6(H_2W_{12}O_{40}).4H_2O]$.

6. The method according to claim 1, wherein the salt containing Cu is copper nitrate, $[Cu(NO_3)_2.3H_2O]$, or copper acetate, $[Cu(CH_3COO)_2.H_2O]$.

7. The method according to claim 1, wherein the salt containing tungsten is ammonium metatungstate, $[(NH_4)_6(H_2W_{12}O_{40}).4H_2O]$, or ammonium paratungstate, $[(NH_4)_{10}(H_{10}W_{12}O_{46})]$.

8. A method of producing a tungsten-copper based sintered alloy for heat-sink materials comprising:

producing a tungsten-copper based composite powder by the method comprising comprising:

preparing a composite oxide powder by dissolving a water-soluble tungsten salt, and a salt containing copper in water, followed by spray-drying the resulting mixture and calcining the resulting spray dried mixture;

preparing a tungsten oxide powder by calcining a salt containing tungsten;

forming an ultra-fine tungsten-copper based composite oxide powder by mixing 20~75 wt % of the composite oxide powder with 80~25 wt % of the tungsten oxide powder, followed by ball-milling the tungsten-copper based composite powder-tungsten oxide powder mixture; and reducing the ultra-fine tungsten-copper based composite oxide powder;

compacting the tungsten-copper based composite powder to form a green body; and sintering the green body.

9. The method according to claim 8, wherein said sintering is carried out at temperature of 1,100~1,450° C.

10. A method of producing a tungsten-copper based sintered alloy for heat-sink materials, comprising:

producing an ultra-fine tungsten-copper based composite oxide powder by the method comprising:

preparing a composite oxide powder by dissolving a water-soluble tungsten salt, and a salt containing copper in water, followed by spray-drying the resulting mixture and calcining the resulting spray dried mixture;

preparing a tungsten oxide powder by calcining a salt containing tungsten;

forming the ultra-fine tungsten-copper based composite oxide powder by mixing 20~75 wt % of the composite oxide powder with 80~25 wt % of the tungsten oxide powder, followed by ball-milling the tungsten-copper based composite powder-tungsten oxide powder mixture;

compacting the ultra-fine tungsten-copper based composite oxide powder to form a compacted body;

reducing the compacted body; and sintering the compacted body.

11. The method according to claim 10, wherein sintering is carried out at temperature of 1,100~1,450° C.

* * * * *